United States Patent [19]

Williams et al.

[11] Patent Number: 4,557,389

[45] Date of Patent: Dec. 10, 1985

[54] STORAGE RACK FOR FOOD PROCESSOR TOOL DISCS

[75] Inventors: James E. Williams, Stamford; Edward R. Kozlowski, Southport, both of Conn.

[73] Assignee: Cuisinarts, Inc., Greenwich, Conn.

[21] Appl. No.: 494,181

[22] Filed: May 13, 1983

[51] Int. Cl.⁴ ............................................... A47F 7/00
[52] U.S. Cl. ........................................ 211/13; 211/40
[58] Field of Search ................... 211/13, 40, 41, 60 T, 211/71, 23; 312/10

[56] References Cited

U.S. PATENT DOCUMENTS

| | | | |
|---|---|---|---|
| 1,698,249 | 1/1929 | Wiehl | 211/40 |
| 2,354,872 | 8/1944 | Mitnick | 211/40 X |
| 2,813,633 | 11/1957 | Welling | 211/41 |
| 3,534,862 | 10/1970 | Shambelan | 211/41 |
| 3,907,116 | 9/1975 | Wolf et al. | 211/40 |

Primary Examiner—Ramon S. Britts
Assistant Examiner—Sarah Lechok
Attorney, Agent, or Firm—Parmelee, Bollinger & Bramblett

[57] ABSTRACT

A rack is disclosed for storing food processor tool discs of the type having a receptacle or socket structure offset from its axis of rotation and located beneath the lower surface of the disc for receiving the upper end of a removable elongated hub on which the tool disc is mounted during operation, such receptacle having a generally crescent-like configuration. The rack includes a base having a plurality of parallel slots for receiving the tool discs and a vertical wall extending upwardly alongside each slot. Each of the vertical walls includes an offset portion for receiving the crescent-like hub receptacle of the tool disc.

11 Claims, 6 Drawing Figures

STORAGE RACK FOR FOOD PROCESSOR TOOL DISCS

BACKGROUND OF THE INVENTION

In the period of a few years, the food processor has become one of the most popular kitchen appliances. A typical food processor comprises a substantially cylindrical bowl mounted above a drive unit. A tool disc within the bowl has one or more blades, graters, or other food processing elements and an elongated hub or shank which extends downwardly for coupling to the drive unit, permitting the hub and tool disc mounted on the hub to be rotated. A cover on the bowl includes a feed tube through which food items are inserted and pushed down by a food pusher or plunger for processing by the tool disc.

In conventional prior art food processors, each of the tool discs has its own elongated hub. Such discs, as a result, are awkward to store. In order to overcome this problem, there has been developed tool discs having removable hubs. A receptacle for the removable hub is secured to the underside of the tool disc. This receptacle enables a tool disc to be mounted upon and locked to the hub in readiness for using the tool disc and hub in a food processor. The lower end of the elongated hub is coupled to the tool drive of the food processor. A tool disc with a generally crescent-shaped receptacle for mounting upon a removable hub is disclosed and claimed in our co-pending U.S. Pat. application, Ser. No. 274,720, filed June 18, 1981, entitled "Removable Head Rotary Tool for Food Processors", now U.S. Pat. No. 4,456,184 and assigned to the same assignee as the present invention. In such removable head tools, each of the tool discs includes a generally crescent-shaped receptacle for mounting upon the upper end of the enlogated hub. Such removable head tool discs are much less awkward and easier to store than conventional discs with their permanently attached long hubs. However, one problem which remains is that many of these tool discs include sharp blades, slicing elements or other sharpened working elements which can injure a person who inadvertently grasps one improperly. Also, random storage in a drawer or on a shelf may permit the sharp working elements to become dulled by abrasion.

Accordingly, it is a primary object of the present invention to provide a rack for storing such tool discs each in a predetermined orientation. Another object is to provide such a rack wherein the discs are stored in such a manner that they will not be grasped in a manner likely to cause injury. Another object is to provide a rack which protects the working elements of the tool discs. Other objects, features, and advantages will become understood and appreciated from a consideration of the following description including the drawings, and appended claims.

SUMMARY OF THE INVENTION

There is provided a rack for storing a plurality of generally disc-shaped food processing tools, each having a hub receptacle in the general form of a crescent mounted on the under side. The rack includes a base which defines a plurality of parallel, substantially horizontal slots. A vertical wall extends upwardly from the base along each of the slots. Each wall includes a first portion adjacent the slot and extending from one end of the slot to a location intermediate its ends. A second wall portion is parallel to, but spaced from the slot in offset relation to the slot and extends from the intermediate location to the other end of the slot. A third wall portion joins the first and second wall portions at the intermediate location.

DESCRIPTION OF THE PREFERRED EMBODIMENT

Figure 4:
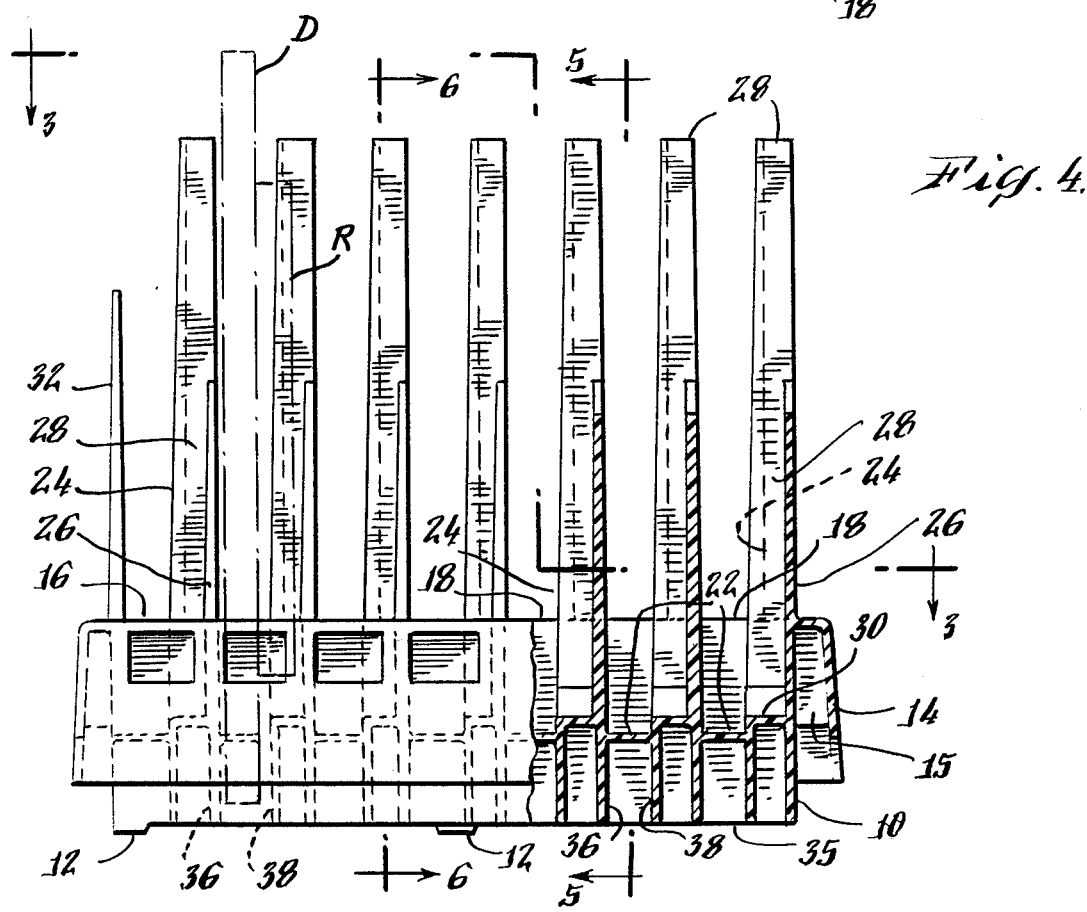
FIG. 4 is a partial cross-section and partial elevation taken substantially along the offset line segments 4—4 of FIG. 3.

The invention is in the form of a rack which, in the described embodiment, is molded as a single plastic unit. However, it will be understood that it could also be assembled of discrete parts. It comprises a substantially rectangular base 10 having three feet 12. There is one foot 12 at each lower front corner of the base 10, and the third foot is at the lower center of the rear of the base 10, as seen in FIG. 4. A decorative skirt 14 surrounds the base 10 depending from its upper surface, as will be seen most clearly from FIGS. 2, 4, and 5. The skirt 14 slopes downwardly outwardly at a small angle to the vertical.

Figure 3:
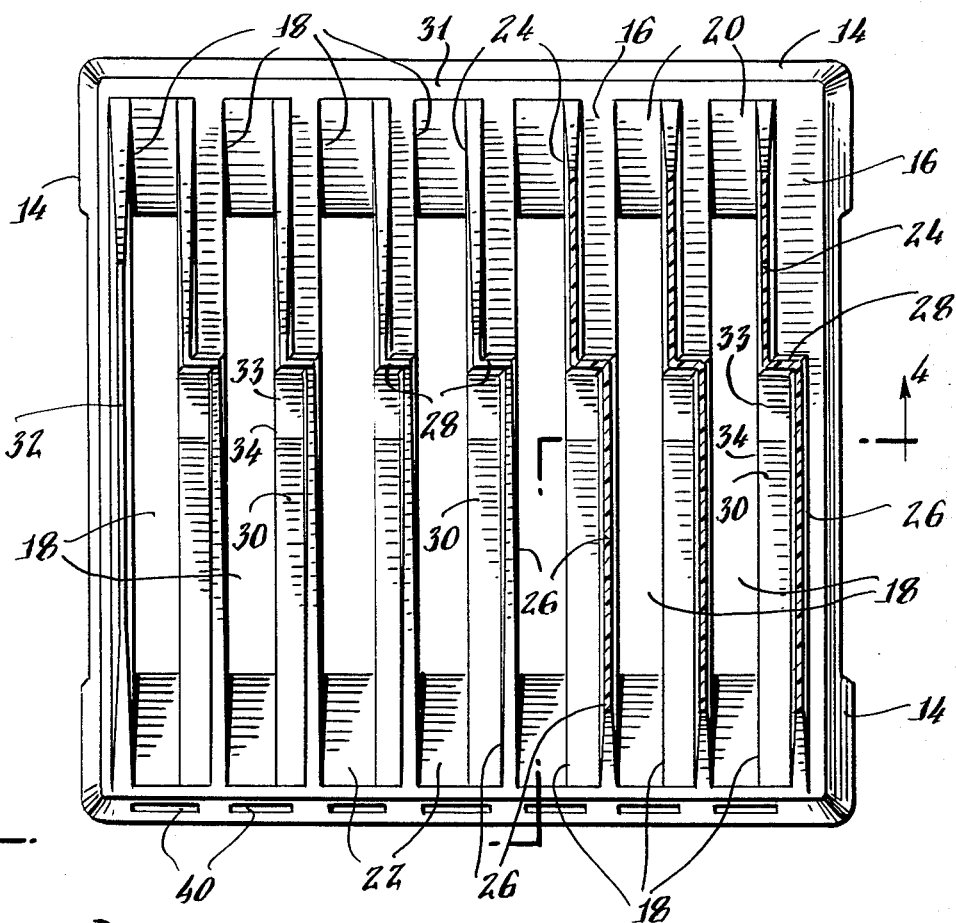
FIG. 3 is a top view of the rack of FIG. 2, in partial cross-section along the offset line segments 3—3 of FIG. 4.
Figure 5:
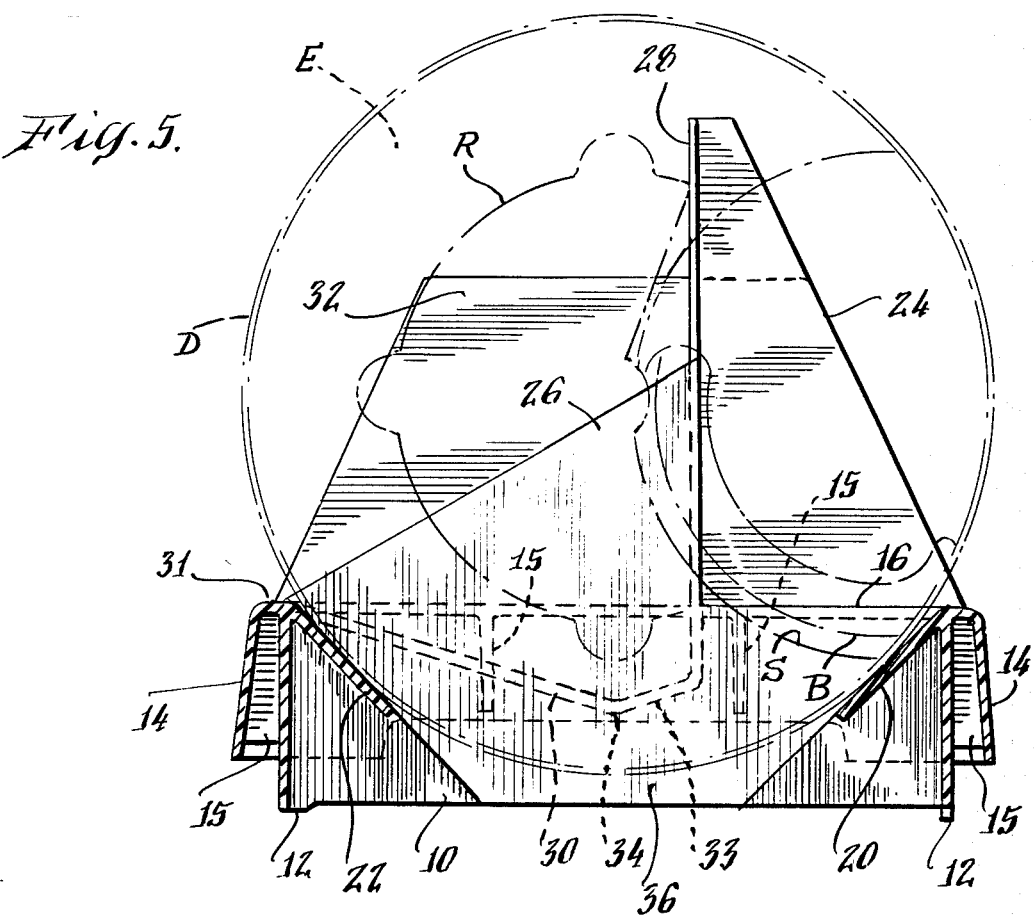
FIG. 5 is a cross-section taken substantially along the line 5—5 of FIG. 4.

The base 10 has a horizontal top surface 16 defining a plurality of substantially identical spaced parallel rectangular slots 18 (FIG. 3). This embodiment of the rack includes seven of these slots 18. The slots extend completely through the top surface 16, but each end of each slot is bounded by a downwardly depending angled shelf 20, 22 (FIGS. 3 and 5). Each of these shelves 20, 22 slopes downwardly and inwardly at an angle of 45° to the horizontal top surface 16 as seen in FIG. 5.

A wall extends upwardly alongside each of the seven slots 18. The seven walls are substantially identical. Each wall includes a relatively high triangular shaped rear wall portion 24, which is immediately adjacent to a respective neighboring one of the slots 18, as shown in FIG. 3. There is also a relatively low sloping triangular shaped front wall portion 26 which is parallel to, but spaced in offset parallel relationship from, its neighboring slot 18, as shown in FIG. 3. The wall portions 24, 26 of each wall are interconnected by a vertically extending tall and narrow perpendicular wall portion 28 which extends up to the full height of the rear wall portion 24. The base 10 at the bottom of each of wall members 26 is depressed to form a well 30 adjacent to each of slots 18, as is shown most clearly in FIGS. 3, 5, and 6.

Figure 6:
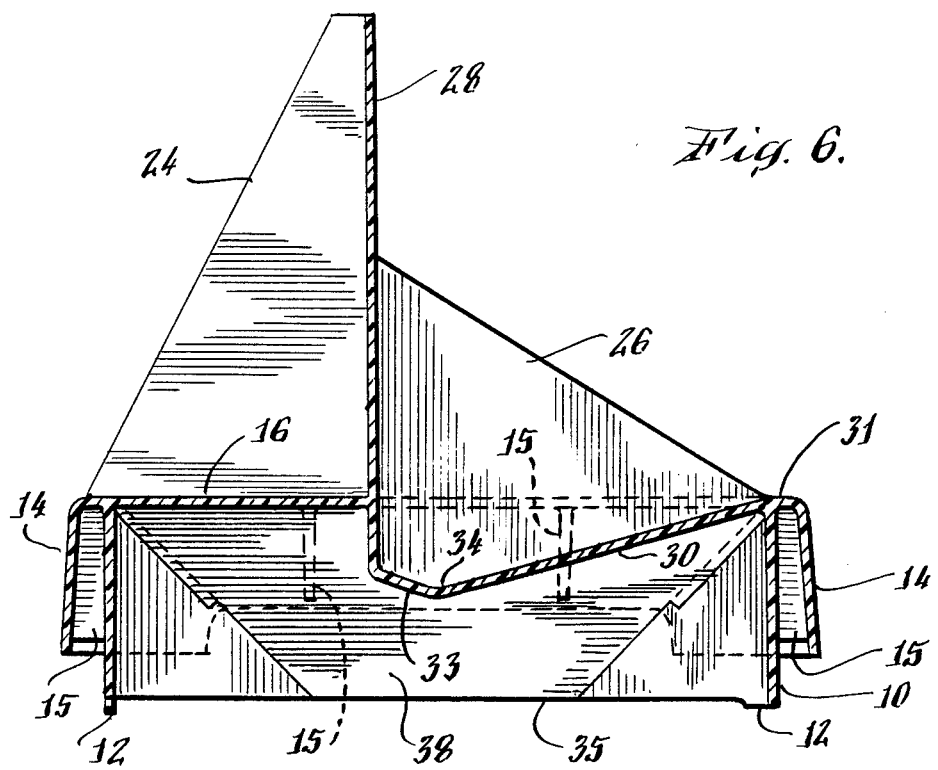
FIG. 6 is a cross-section taken substantially along the line 6—6 of FIG. 4.

As seen in FIG. 6, the bottom of the well 30 slopes downwardly and inwardly at an angle of 15° relative to the horizon tal top surface 16 of the base. A rounded upper horizontal portion 31 (FIG. 6) of the skirt 14 extends across the front of the rack. This upper skirt portion 31 is at the same horizontal level at the top surface 16 and merges with the front of the downwardly inwardly sloping bottom of well 30 and also merges (FIG. 5) with the downwardly inwardly sloping shelf 22. A short bottom back portion 33 of the well 30 slopes upwardly rearwardly at an angle of 15° relative to the horizontal top surface 16. The low point 34 of the well 30 is located midway between front and back of the rack.

Figure 2:
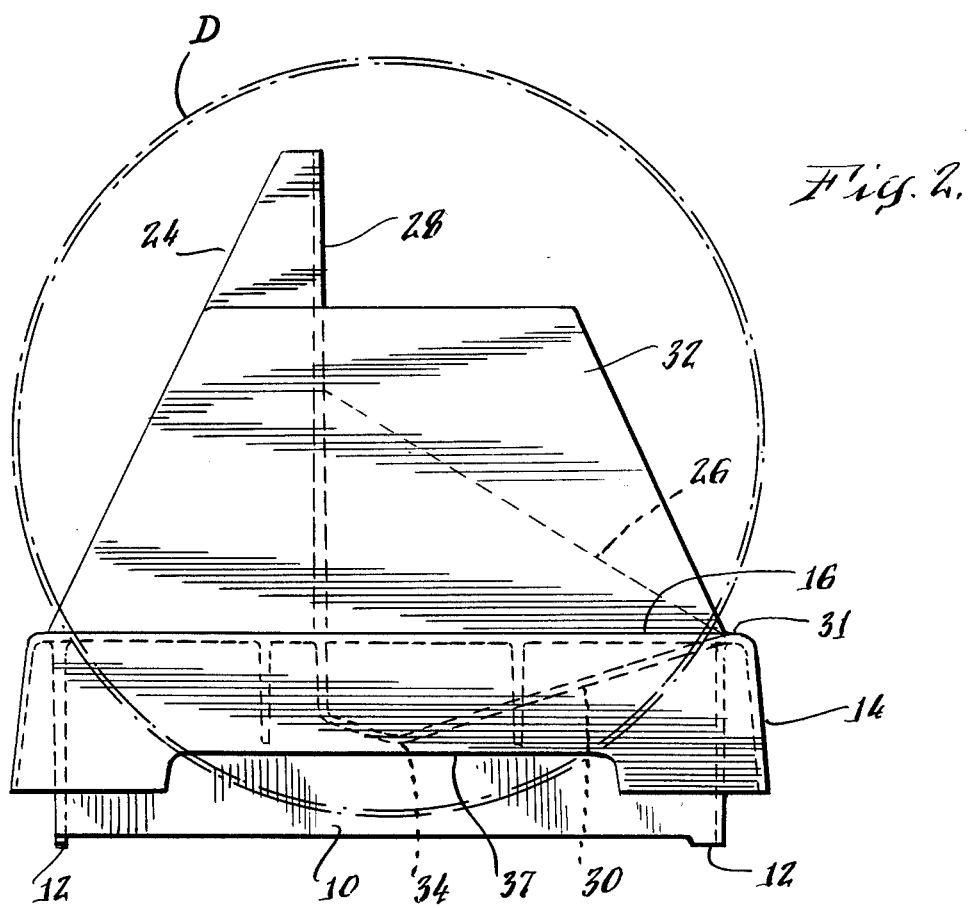
FIG. 2 is a left end view of the rack of FIG. 1.

The top edge of the triangular shaped front wall portion 26 slopes at an angle of 30° to the horizontal top surface 16 of the base, as seen in FIGS. 2 and 6. The rear edge of the triangular shaped rear wall portion 24 slopes at an angle between 25° and 26° to the narrow vertical wall 28, as seen in FIGS. 2 and 6. The overall height of this rack is, for example, 5.75 inches, above the bottom edge 35 of the base 10, and the legs 12 project slightly below this edge 35. It has a square base configuration as seen in FIG. 3, with the skirt 14 measuring 6.40 inches in length and in depth front-to-back.

Upon viewing the rack of the invention from the top as in FIG. 3, it will be noted that a "stepped" wall 24-28-26 of the type described extends along the right-hand edge of each of the slots 18. In order to enclose the left end of the rack, a planar end wall 32 extends upwardly from base 10 alongside leftmost slot 18. This left end wall 32 has a truncated triangle shape as seen in FIG. 2. Its sloping edges have the same slope as the rear edge of the triangular rear wall portion 24, and the rear edge of this end wall 32 is aligned with the rear edges of the rear wall portions 24.

Figure 1:
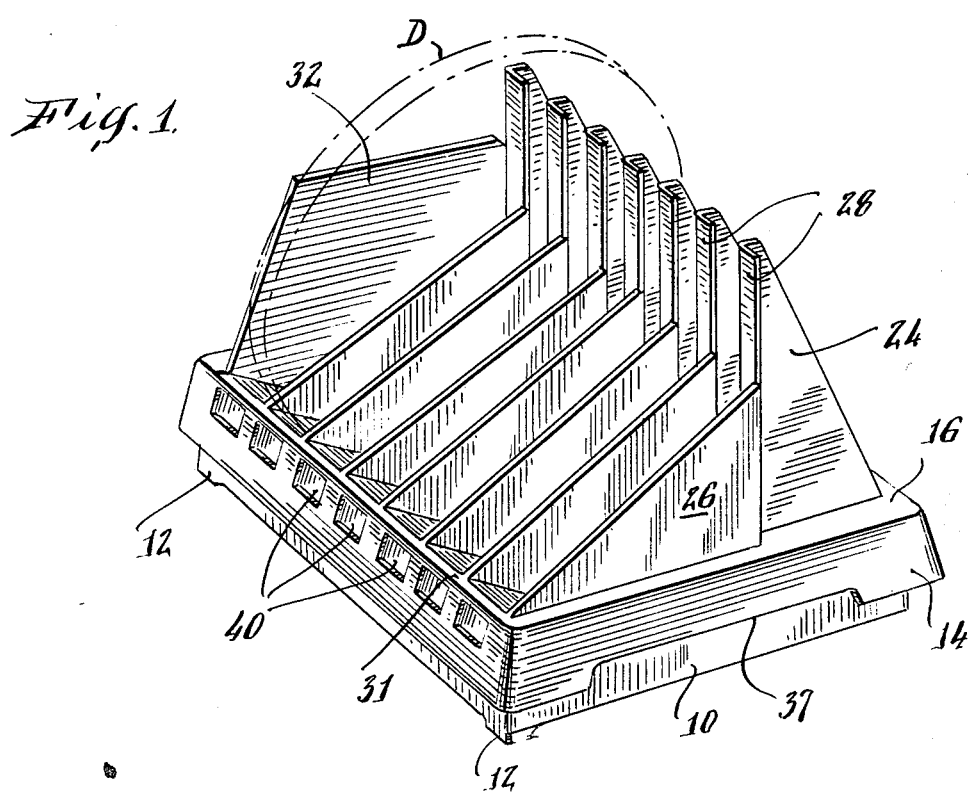
FIG. 1 is a perspective view of a rack in accordance with this invention.

As seen most clearly in FIGS. 1 and 2, the skirt 14 is attractively recessed upwardly at 37 along its main central portion along each end of the rack. There are stiffening fillets 15 (FIGS. 2, 4, 5 and 6) between the skirt 14 and the base 10.

As seen in FIG. 4, there are downwardly extending lower wall portions or ribs 36 and 38 which are aligned with the left and right side of the slots 18, in effect defining downwardly extending side walls of these slots. The lower edges of these lower wall portions 36 and 38 are level with the lower edge 35 of the base 10. The lower wall portion 36 is in the same plane as the triangular front wall portion 26, as seen also in FIG. 5. The other lower wall portion 38 is in the same plane as the triangular rear wall portion 24, as seen also in FIG. 6. These lower wall portions 36 and 38 are joined to and stiffen the shelves 20 and 22.

As has been previously explained, the function of the rack of this invention is to hold food processor tool discs of the type described in the above-referenced co-pending application. These tool discs are characterized by a generally crescent-shaped socket receptacle "R" mounted on the underside of the tool disc. The receptacle is slightly more than semicircular, covering an arc of approximately 210°. Furthermore, this hub receptacle R is offset from the center (axis of rotation) of the tool disc. The offset permits the use of a dog-leg shaped elongated hub for enabling the cutting blade or other working surface of the tool disc to be maximized, as is disclosed and claimed in U.S. Pat. No. 4,227,655.

As pointed out above, one of the features of this invention is that the user's fingers are protected from the sharp cutting blades when inserting or removing the tool discs from the rack. FIG. 5 illustrates the manner in which this is accomplished. A tool disc D is illustrated in dash and dotted outline having mounted to its lower surface the crescent-shaped receptacle R for receiving the elongated hub. A curved slot S in the disc surface is associated with a sharp, similarly curved cutting blade B. As will be clear from the illustration, the tool disc D is housed in one of the slots 18 of the rack in such a manner that its peripheral rim rests upon the inclined shelves 20, 22. Since the rear wall member 24 is closely adjacent the slot 18, the concave configured region of the crescent-shaped receptacle R is constrained to fit against the transverse wall portion 28. Receptacle R is thus relatively vertical and extends downwardly into the well 30 with the receptacle R resting against the front wall member 26. As seen in FIG. 4, the rim of the tool disc D near the bottom of the rack is in effect nested in sandwiched relationship between the lower wall portions 36 and 38 thereby further stabilizing the tool disc resting in a vertical plane. The well 30 (FIG. 5) provides clearance for receiving the lower cusp portion of the crescent-shaped hub receptacle R. In this fashion, the sharp blade B of the tool disc D is enclosed near the lower rear of the rack so as not to be engaged by the user's fingers upon either storing or removing the tool disc. The user naturally grasps the exposed region E (FIG. 5) of the tool disc above the upper front of the rack. Thus, the user is inherently and advantageously induced to grasp the region E which is near the main body of the crescent-shaped receptacle R and is advantageously generally located farthest away from the sharp cutting or working blade element B.

A relatively large number of tool discs are neatly and compactly stored in one rack. At the same time, the blade or other working element of each took disc is protected from dulling contact with other agencies.

There are shallow recesses 40 in the front face of the front skirt 14. These shallow recesses are seven in number and are aligned with the respective slots 18 for receiving labels, numbers, or other indicia indicating the characteristics of the respective tool discs D reposing in the rack. For example, there are tool discs for producing different slicing thicknesses, other tool discs produce grating, and there are French fry slicing tool discs, julienne cutting tool disc, etc. It is a convenience to the user for these various tools to be identified at a glance when reaching toward the rack to pick out a particular desired tool intended for use in performing a food processing function.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

We claim:

1. A rack for storing a plurality of generally disc-shaped food processing tools, each having a hub receptacle mounted on the lower side for removably mounting the disc tool on an elongated hub during usage of the disc tool, said rack comprising:
 a base defining a plurality of parallel, substantially horizontal slots therein;
 a vertical wall extending upwardly from said base along each of said slots and including (a) a first wall portion adjacent said slot and extending from a first end of said slot to a location intermediate the ends of said slot, (b) a second wall portion parallel to, but spaced in an offset relationship away from said slot and extending from said intermediate location to the second end of said slot, and (c) a third wall protion joining said first and second wall portions at said intermediate location, said third wall portion being perpendicular to said first and second wall portions, and the dimensions of each slot being such as to receive a food processing disc tool inserted therein with the disc tool oriented in a generally vertical plane and the space between each slot and its associated second offset wall portion being sufficient to receive the hub receptacle of the inserted disc tool.

2. The rack of claim 1 wherein:

said base is recessed between each slot and its corresponding second offset wall portion forming a well to receive the lower portion of said hub receptacle with the disc tool oriented in a generally vertical plane.

3. The rack of claim 1 wherein:

said slots and vertical walls alternate along said base and one slot at one end of the rack is bounded by one such vertical wall and an additional enclosing end wall extending upwardly from said one end of said base along the unbounded side of said one slot.

4. The rack for storing a plurality of generally disc-shaped tools as claimed in claim 1 wherein:

the rack has a front and a back, the dimensions of each slot are such as to receive a food processing disc tool resting therein with the disc tool oriented in a generally vertical plane, the second end of each slot and the second offset wall portion of each wall are positioned near the front of the rack, and the base is recessed between each slot and its corresponding second offset wall portion forming a well for receiving the lower portion of the hub receptacle of a disc tool with the disc tool resting in a generally vertical plane in the slot.

5. A rack for storing a plurality of generally disc-shaped food processing tools, each such disc tool having a hub receptacle on the lower side of the disc tool for removably mounting the disc tool onto an elongated hub during usage of the disc tool in a food processor, and each such tool having food processing cutting means on the disc tool located between the hub receptacle and the rim of the disc tool, said rack comprising:

a base defining a plurality of spaced, parallel, substantially horizontal slots therein, each such slot being adapted to receive the rim of a disc tool inserted therein with the disc tool orient generally in an upright plane, said rack having a front and a back with said spaced slots extending generally from front to back generally perpendicular to the front and back of the rack, a wall extending upright from the base along beside each of said slots, each wall including (a) a first wall portion adjacent to the slot and extending forwardly from the back end of the slot to a location intermediate the front and back ends of the slot, each wall including (b) a second wall portion generally parallel to but offset from the slot and extending rearwardly from the front end of the slot to said intermediate location, each wall including (c) a narrow third wall portion joining said first and second wall portions at said intermediate location, said narrow wall portion extending upwardly, and the space between each slot and its associated second offset wall portion being sufficient to receive the hub receptacle, with said hub receptacle positioned near said second wall portion near the front of said rack and with said food processing cutting means positioned near said first wall portion near the rear of said rack.

6. The rack for storing a plurality of disc tools as claimed in claim 5, in which:

said base is recessed downwardly near said second offset wall portion forming a well for receiving a lower portion of the hub receptacle with the disc tool oriented in a generally upright plane.

7. The rack as claimed in claim 5 for storing a plurality of disc tools having cutting means in a first region located generally between the rim of the disc tool and the axis of rotation of the disc tool during usage and having said hub receptacle in a second region located on the opposite side of the axis from said cutting means in a second region located generally diametrically opposed to said first region, in which:

each such tool disc is inserted in a slot with the first region of the disc tool containing the cutting means being positioned near the back of the rack and the second region of the disc containing the hub receptacle being positioned near the front of the rack, thereby assuring that a user in reaching toward the front of the rack for extracting a selected disc tool from a slot in the rack will be caused to grasp the second region of the disc tool and will be prevented from grasping the first region of the disc tool where the cutting means are located.

8. The rack as claimed in claim 7, in which:

said base is recessed downwardly near said second offset wall portion forming a well for receiving a lower portion of the hub receptacle with the disc tool oriented in a generally upright plane in the slot.

9. The rack for storing a plurality of generally disc-shaped food processing tools as claimed in claim 5, in which:

said first wall portion extends upwardly above the base to a greater height than said second wall portion for protecting the food processing cutting means positioned near said first wall portion near the rear of the rack and for exposing the disc tool near said second wall portion accessible to be grasped by a user near said second wall portion near the front of the rack.

10. The rack as claimed in claim 9, in which:

said first wall portion is generally triangular shaped with its highest point being located near said third narrow wall portion, and said second wall portion is also generally triangular shaped with its highest point also being located near said third narrow wall portion.

11. The rack for storing a plurality of generally disc-shaped food processing tools as claimed in claim 5, in which:

the front end of each slot is bounded by a downwardly rearwardly sloping shelf against which the rim of a disc tool can rest when inserted into the slot with the hub receptacle of the disc tool being positioned near said third narrow wall portion.

* * * * *